US011170256B2

(12) United States Patent
Min et al.

(10) Patent No.: US 11,170,256 B2
(45) Date of Patent: Nov. 9, 2021

(54) MULTI-SCALE TEXT FILTER CONDITIONED GENERATIVE ADVERSARIAL NETWORKS

(71) Applicant: NEC Laboratories America, Inc., Princeton, NJ (US)

(72) Inventors: Renqiang Min, Princeton, NJ (US); Bing Bai, Princeton Junction, NJ (US); Yogesh Balaji, Hyattsville, MD (US)

(73) Assignee: NEC Corporation

( * ) Notice: Subject to any disclaimer, the term of this patent is extended or adjusted under 35 U.S.C. 154(b) by 46 days.

(21) Appl. No.: 16/577,337

(22) Filed: Sep. 20, 2019

(65) Prior Publication Data
US 2020/0097766 A1    Mar. 26, 2020

Related U.S. Application Data

(60) Provisional application No. 62/736,484, filed on Sep. 26, 2018.

(51) Int. Cl.
*G06K 9/00* (2006.01)
*G06K 9/62* (2006.01)
(Continued)

(52) U.S. Cl.
CPC ......... *G06K 9/6256* (2013.01); *G06F 40/279* (2020.01); *G06K 9/00718* (2013.01);
(Continued)

(58) Field of Classification Search
CPC ............. G06K 9/6256; G06K 9/00791; G06F 40/279; G06N 3/0454; G06N 3/088
See application file for complete search history.

(56) References Cited

U.S. PATENT DOCUMENTS

2012/0100825 A1* 4/2012 Sherman ................. H04W 4/90
455/404.2
2017/0127016 A1* 5/2017 Yu ........................ G06N 3/0445
(Continued)

OTHER PUBLICATIONS

Pan et al, To Create What You Tell: Generating Videos from Captions, MM'17, Oct. 23-27, Mountain View, CA, USA, p. 1789-1798 (Year: 2017).*

(Continued)

*Primary Examiner* — Ping Y Hsieh
*Assistant Examiner* — Xiao Liu
(74) *Attorney, Agent, or Firm* — Joseph Kolodka (57) ABSTRACT

Systems and methods for processing video are provided. The method includes receiving a text-based description of active scenes and representing the text-based description as a word embedding matrix. The method includes using a text encoder implemented by neural network to output frame level textual representation and video level representation of the word embedding matrix. The method also includes generating, by a shared generator, frame by frame video based on the frame level textual representation, the video level representation and noise vectors. A frame level and a video level convolutional filter of a video discriminator are generated to classify frames and video of the frame by frame video as true or false. The method also includes training a conditional video generator that includes the text encoder, the video discriminator, and the shared generator in a generative adversarial network to convergence.

19 Claims, 6 Drawing Sheets

(51) Int. Cl.
  *G06N 3/08*     (2006.01)
  *G06N 3/04*     (2006.01)
  *G06F 40/279*   (2020.01)

(52) U.S. Cl.
  CPC ..... *G06K 9/00771* (2013.01); *G06K 9/00791* (2013.01); *G06N 3/0454* (2013.01); *G06N 3/088* (2013.01)

(56) References Cited

U.S. PATENT DOCUMENTS

2018/0336439 A1* 11/2018 Kliger ............... G06N 3/0472
2019/0130221 A1*  5/2019 Bose ................. G06K 9/6267

OTHER PUBLICATIONS

Tulyakaovetal, MoCoGAN: Decomposing Motion and Content for Video Generation, arXiv 1707.04993v2 Dec. 14 (Year: 2017).*
Chen et al., Brain-Inspired Cognitive Model With Attention for Self-Driving Cars, IEEE TR. on Cognitive and Development Systems, vol. 11, Issue 1, March, p. 13-25 (Year: 2019).*
Yitong Li et al., "Video Generation from Text", Association for the Advancement of Artificial Intelligence (www.aaai.org), Apr. 2018.

* cited by examiner

MULTI-SCALE TEXT FILTER CONDITIONED GENERATIVE ADVERSARIAL NETWORKS

RELATED APPLICATION INFORMATION

This application claims priority to U.S. Provisional Patent Application No. 62/736,484, filed on Sep. 26, 2018, incorporated herein by reference herein its entirety.

BACKGROUND

Technical Field

The present invention relates to conditional generative adversarial networks (GANs) and more particularly applying GANs to text-description conditioned data generation systems.

Description of the Related Art

A generative adversarial network (GAN) is a class of machine learning systems in which neural networks contest with each other. GANs can learn to generate new data with the same statistics as a training set. For example, a GAN can generate photographs with authentic characteristics based on training with photographs. GANs can be used for unsupervised, semi-supervised, and fully supervised learning.

SUMMARY

According to an aspect of the present invention, a method is provided for implementing a text filter generative adversarial network. The method includes receiving a text-based description of active scenes and representing the text-based description as a word embedding matrix. The method includes using a text encoder implemented by neural network to output frame level textual representation and video level representation of the word embedding matrix (the frame level textual representation and video level textual representation can be shared/identical for some tasks). The method also includes generating, by a shared generator, frame by frame video based on the frame level textual representation, the video level representation and noise vectors. A frame level and a video level convolutional filter of a video discriminator are generated to classify frames and a whole video as true or false. The method also includes training a conditional video generator that includes the text encoder, the video discriminator, and the shared generator in a generative adversarial network to convergence.

According to another aspect of the present invention, a system is provided for implementing a text filter generative adversarial network. The system includes a processor device operatively coupled to a memory device. The processor device receives a text-based description of active scenes and representing the text-based description as a word embedding matrix. The processor device uses a text encoder implemented by neural network to output frame level textual representation and video level representation of the word embedding matrix. The processor device generates, by a shared generator, frame by frame video based on the frame level textual representation, the video level representation and noise vectors. A frame level and a video level convolutional filter of a video discriminator are generated to classify individual frames and the whole video as true or false. The processor device also trains a conditional video generator that includes the text encoder, the video discriminator, and the shared generator in a generative adversarial network to convergence.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided to/for processing video by implementing a text filter generative adversarial network (TF-GAN) based on recurrent neural networks (RNNs). The TF-GAN can produce high resolution videos of varying length due to the recurrent nature of the generator (in contrast, previous approaches have been known to employ convolutional neural networks as generators to generate fixed-length videos). The example embodiments include a conditional generative adversarial network (GAN) for video generation from text. The conditional GAN can include a discriminator, a shared generator, and a text encoder.

In one embodiment, the system effectively fuses the video and text representations in a discriminator model so that generator conditions well on the text. Text conditioning is improved using a scheme based on generating convolution filters from the text features.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
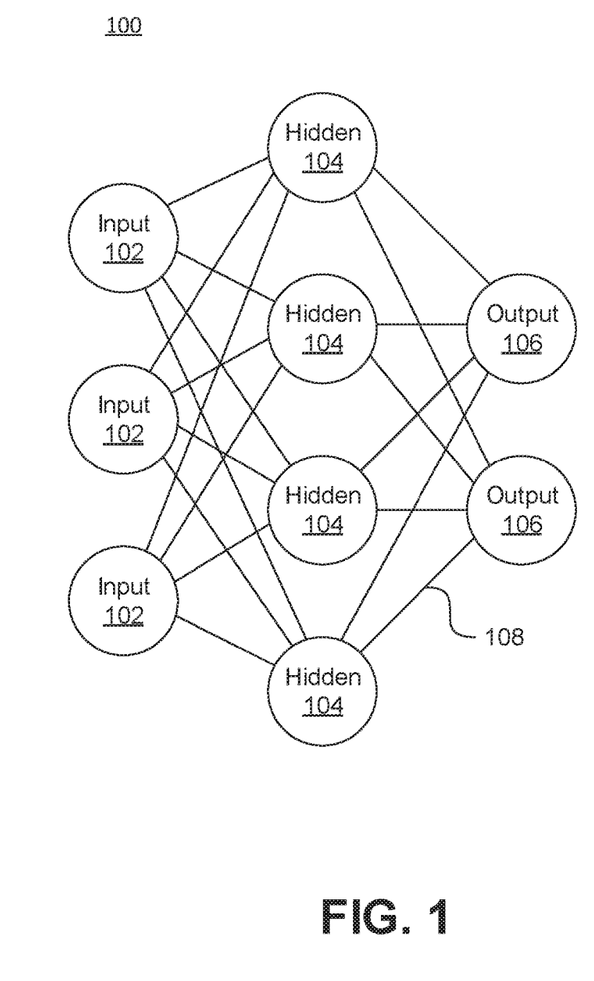
FIG. 1 is a generalized diagram of a neural network, in accordance with an embodiment of the present invention.

Referring now to the drawings in which like numerals represent the same or similar elements and initially to FIG. 1, a generalized diagram of a neural network is shown.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. In example embodiments herein, the training data can include text and video. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
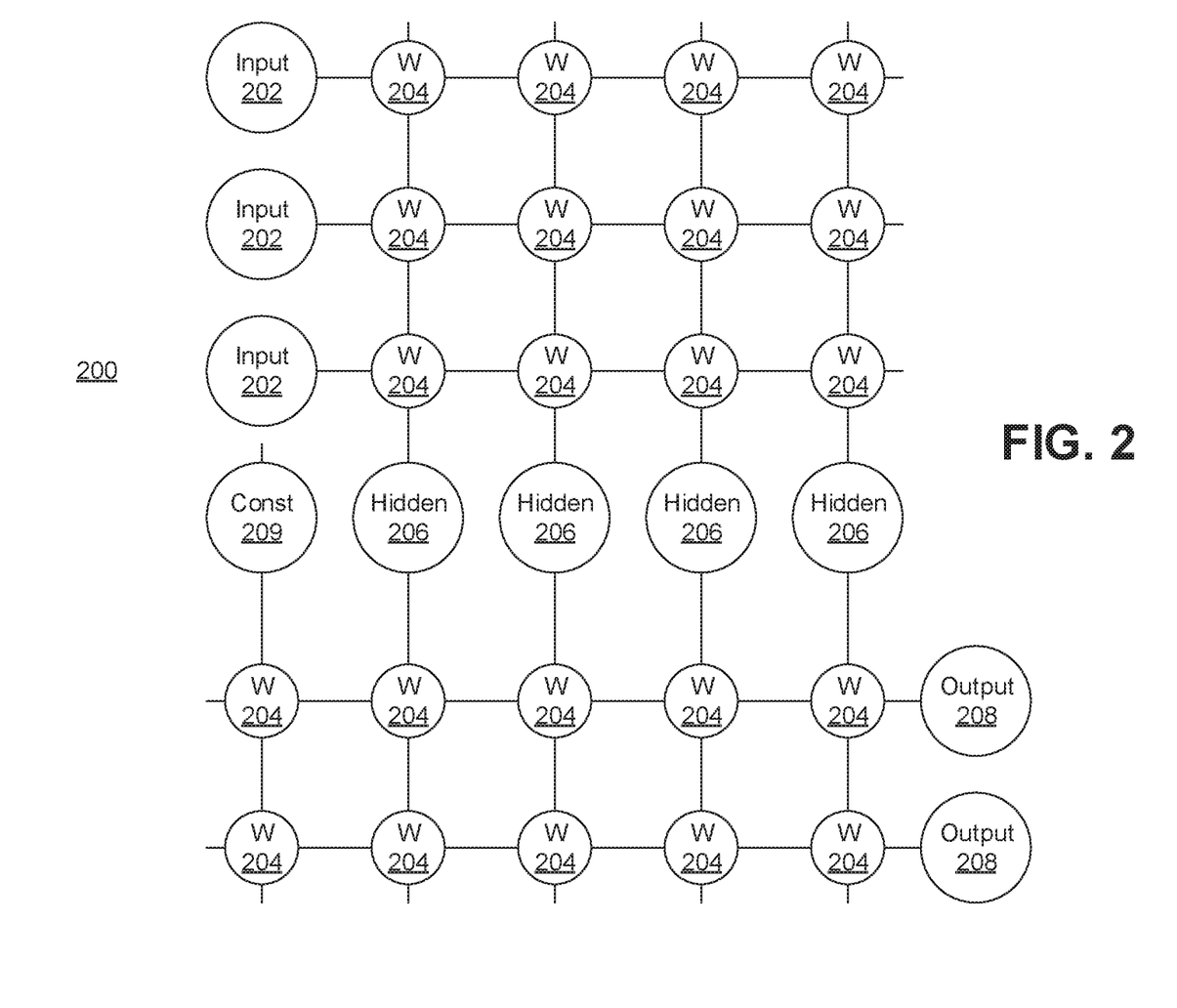
FIG. 2 is a diagram of an artificial neural network (ANN) architecture, in accordance with an embodiment of the present invention.

Referring now to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

The ANN 200 can be applied to implement text conditioning scheme based on text-filter generation, as described with respect to FIG. 3 and system 300 herein below. The text-filter conditioning scheme that is applied to many different scales of feature representations of video frames.

A residual neural network (ResNet) is an ANN 200 that builds on constructs known from pyramidal cells in the cerebral cortex. Residual neural networks utilize skip connections (or short-cuts) to jump over (for example, some) layers. ResNet models can be implemented with double- or triple-layer skips that contain nonlinearities (for example, a rectified linear unit (ReLU)) and batch normalization in between. In some instances, an additional weight matrix can be used to learn the skip weights.

Figure 3:
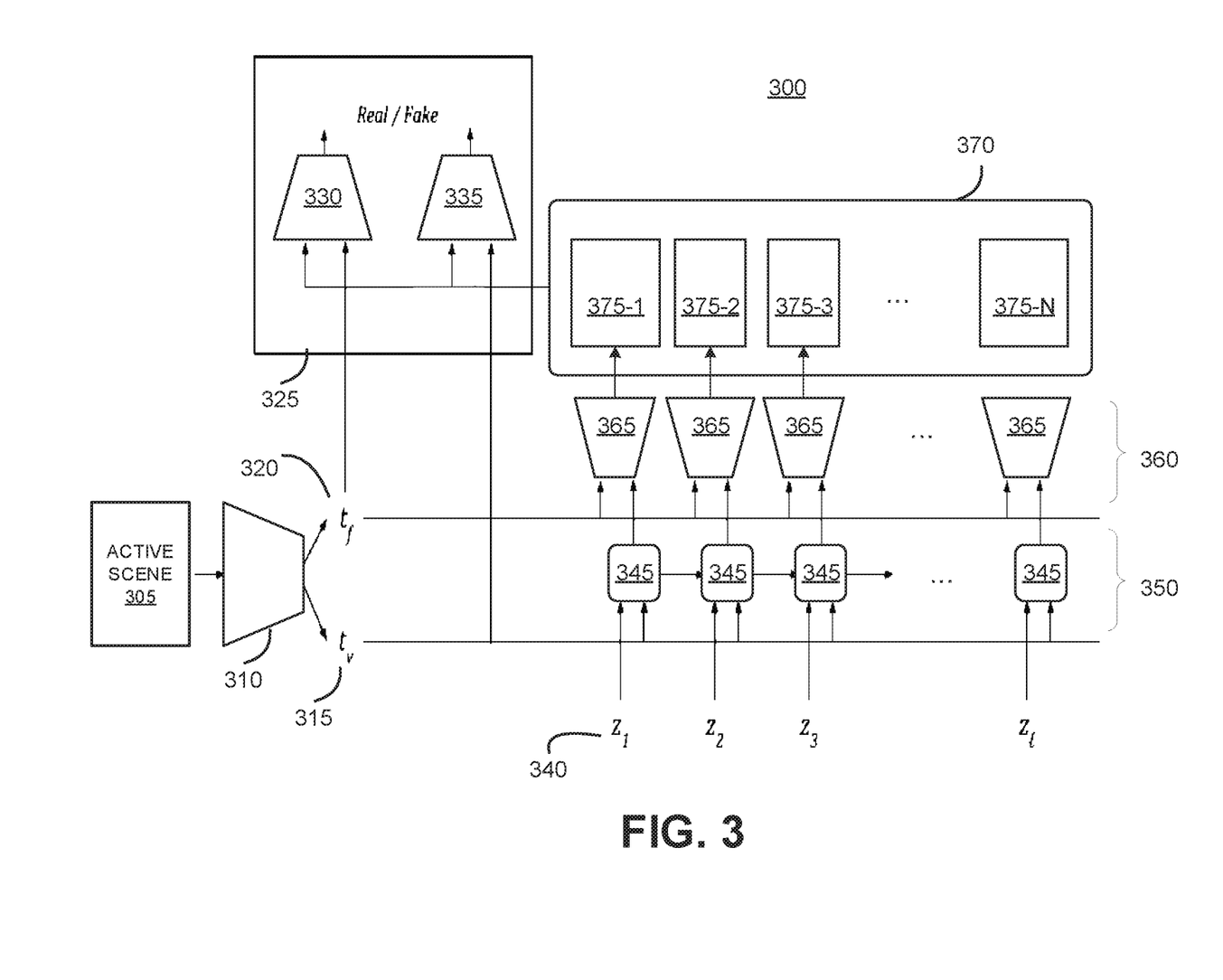
FIG. 3 is a block diagram illustrating a system for implementing a text filter conditional generative adversarial network (TFGAN), in accordance with an embodiment of the present invention.

Referring now to FIG. 3, a system for implementing a text filter conditional generative adversarial network (TFGAN) is illustratively depicted in accordance with an embodiment of the present invention.

As shown in FIG. 3, system 300 includes active scenes 305 (for example, people swimming in a pool, traffic, sports being played, etc.), a text encoder 310, a gated recurrent unit (GRU) 350, and a shared generator 360 that generates video 370 with text conditioning in a discriminator network 325. The active scenes 305 can include scenes that include activities being performed by objects or persons, etc. The active scenes 305 include motion of object within the scene that changes a position of one or more of the objects in the scene over time.

System 300 applies GANs to the domain of videos. System 300 can be used to generate videos 370 based on data points that include images and additional temporal dimensions which make the data points extremely high dimensional. System 300 provides text conditioned video synthesis where the input argument is a text description and the output of system 300 is video synthesized corresponding to the input text. System 300 can be implemented to support (or facilitate, execute, etc.) several applications, such as multimedia applications, generating synthetic dataset, model-based reinforcement learning systems, domain adaptation, etc.

According to example embodiment, to model videos of varying length, system 300 implements a recurrent neural network in the latent space and employs a shared frame generator network, such as a motion and content decomposed generative adversarial network (MoCoGAN) that generates a video by mapping a sequence of random vectors to a sequence of video frames. System 300 implements model for generating high resolution videos using a ResNet style architecture in the generator and the discriminator network. System 300 can also implement a text conditioning scheme based on filter generation to improve the text conditioning. System 300 achieves photo-realistic video synthesis by using a deeper generator-discriminator architecture.

According to example embodiments, system 300 receives (or accesses) n data points {vi; ti}, {i=1, . . . , n} sampled from an underlying joint distribution p(v; t) in the video-sentence space. In these instances, each $v_i$ is a video and $t_i$ is a sentence description. System 300 implements learning of a model capable of sampling from the unknown conditional distribution p(v|t). System 300 learns a transformation function G(z; t) from a known prior distribution $P_z(z)$ and the conditional argument t to the unknown conditional distribution p(v|t). System 300 optimizes the function G using an adversarial training procedure.

As shown in FIG. 3, active scenes 305 are accessed and the text description t is passed to a text encoder model T (310) to get a frame-level representation $t_f$ (320) and a video-level representation $t_v$ (315). In this instance, $t_f$ (320) is a representation common to all frames, and extracts frame-level information such as background, objects, etc. from the text. The video representation $t_v$ (315) extracts the temporal information such as actions, object motion, etc. The text representation along with a sequence of noise vectors $z_i$ (340), i=1, . . . , 1 is passed to a recurrent neural network (345) to produce a trajectory in the latent space. In this instance, 1 denotes the number of frames in the video sequence. This sequence of latent vectors is then passed to a shared frame generator model G (360) to produce the video sequence $v_g$ (370). Shared frame generator model G 360 includes function G (375) that receives the frames $t_f$ (320) and (for example, corresponding) noise vectors $z_i$. Video sequence $v_g$ 370 includes frames 375 generated by the function G (375). The generated video $v_g$ is then passed to two discriminator models, $D_F$ (330) and $D_V$ (335). $D_F$ 330 is a frame-level discriminator that classifies if the individual frames in the video sequence is real/fake (for example, real or fake), whereas the video discriminator model $D_V$ 335 is trained to classify the entire video as real/fake. The discriminator models $D_F$ and $D_V$ also take in the text encodings $t_f$ and $t_v$ as inputs respectively to enforce text conditioning.

To build strong conditional models, system 300 learns good video-text associations in the GAN model. System 300 can implement a technique of sampling negative (v; t) pairs (wrong associations) and training these as fake class, while the correct (v; t) pairs are trained as real class in the discriminator model. System 300 effectively fuses the video and text representations in the discriminator model so that generator 360, which is updated using the gradients from the discriminator network 325, conditions well on the text. System 300 produces well-conditioned models in datasets where there are rich text-video variations.

Figure 4:
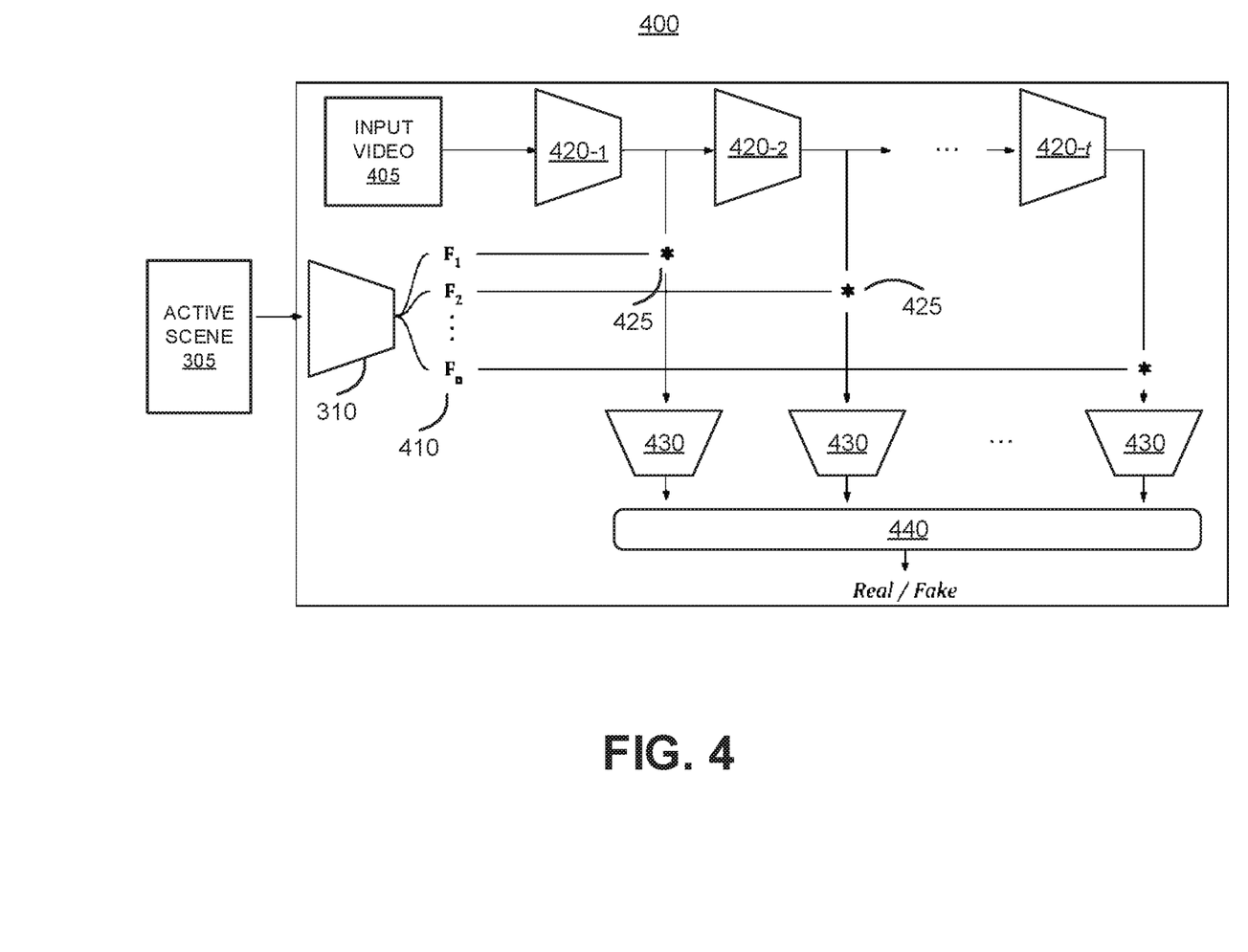
FIG. 4 is a block diagram illustrating a text-filter conditioning framework, in accordance with an embodiment of the present invention.

Referring now to FIG. 4, a system for implementing text-filter conditioning strategy is illustratively depicted in accordance with an embodiment of the present invention.

As shown in FIG. 4, the discriminator model D 325 implements a scheme 400 based on generating convolution filters 410 from the text features. From the text features, system 300 first generates a set of convolution filters $F_i$ (410). Let $d_i$ (420-1 to 420-t) denote the output of the discriminator network at $i_{th}$ level of abstraction, with lower i denoting the earlier layers. Each filter $F_i$ is convolved 425 with the discriminator response $d_i$, and this convolved output is passed through additional convolutions 430 (for example, one or more additional convolutions) after which they are pooled (for example, feature concatenation is applied) 440 to get a video-text representation. System 300 uses this pooled feature vector 440 to classify the (v; t) pairs as real or fake.

The discriminator model D 325 and the generator model G 360 are trained using an adversarial game such as implemented in a conditional GAN. System 300 employs deep Resnet-style architectures for the G-D networks and stabilizes the GAN training. System 300 can use a regularizer in which the norm of the discriminator gradients is penalized. The optimization objective of system 300 can be expressed as:

$$L_{real} = E_{(v,t) \sim pdata,real}\left[\log(D(v, T(t))) + \frac{\gamma}{2}\|\nabla D(v, t)\|\right]$$

where γ is a penalty coefficient regularizing the gradient of the discriminator Eqn. (1)

$$L_{fake} = \frac{1}{2}[E_{(v,t) \sim pdata,fake} \log(1 - D(v, T(t))) + \quad \text{Eqn. (2)}$$
$$E_{x \sim p_z} \log(1 - D(G(z, T(t)), T(t)))]$$

$$\min_G \max_D L_{real} + L_{fake} \quad \text{Eqn. (3)}$$

The text encoder T can be optimized as follows:

$$\max_T L_T = E_{(v,t) \sim pdata,real} \log(D(v, T(t))) + \quad \text{Eqn. (4)}$$
$$E_{(v,t) \sim pdata,fake} \log(1 - D(v, T(t)))$$

In the above set of equations, $p_{data,real}$ denotes the real data distribution with correct video-text correspondences, whereas $p_{data,fake}$ refers to the distribution with incorrect video-text correspondences. Note that system 300 has two discriminator networks $D_F$, and $D_V$ in the models, and that system 300 repeats the above equations for both models. Denoting $L_{real}^F$, $L_{fake}^F$, $L_T^F$ as the losses for frame-level discriminator $D_F$ and $L_{real}^F$, $L_{fake}^F$, $L_T^F$ as the losses for video-level discriminator $D_V$.

To train the models, system 300 can implement a process that includes parameters, iterations and design as follows:

θ: Parameters of G, φF: Parameters of $D_F$, φV: Parameters of $D_V$, φT: Parameters of T.

$N_{iter}$: number of training iterations.

α: Learning rate, $N_b$: batch size.

System 300 can implement a process as follows for t ranges from 1 to the user-specified maximum $N_{iter}$ iterations, begin:

Sample $N_b$ real samples with correct video-text correspondence $\{(v_i^r, t_i^r)\}_{i=1}^{N_b}$ Sample $N_b$ real samples with incorrect video-text correspondence $\{(v_i^f, t_i^f)\}_{i=1}^{N_b}$, Update $D_F$: ,$\Phi_F$-$\Phi_F$+α∇$[L_{real}^F + L_{fake}^F]$,
Update $D_V$: ,$\Phi_V$-$\Phi_V$+α∇$[L_{real}^F + L_{fake}^F]$,
Update G: θ=θ-α∇[ ], $L_{real}^F + L_{fake}^F + L_{real}^V + L_{fake}^V$,
Update T: φT=$\Phi_T$+α∇$[L_T^F + L_T^F + L_T^V + L_T^V]$ System 300 then ends the process.

System 300 can generate photo-realistic videos using this deeper generator-discriminator architecture. According to example embodiments, system 300 can be implemented to generate special effects in movies, augmented data for anomaly detection systems, and simulation scenes for self-driving cars, etc.

System 300 can generate videos that contain abnormal scenes from text descriptions for training artificial intelligence (AI) surveillance systems. System 300 can generate traffic videos from traffic descriptions for training self-driving control systems.

Figure 5:
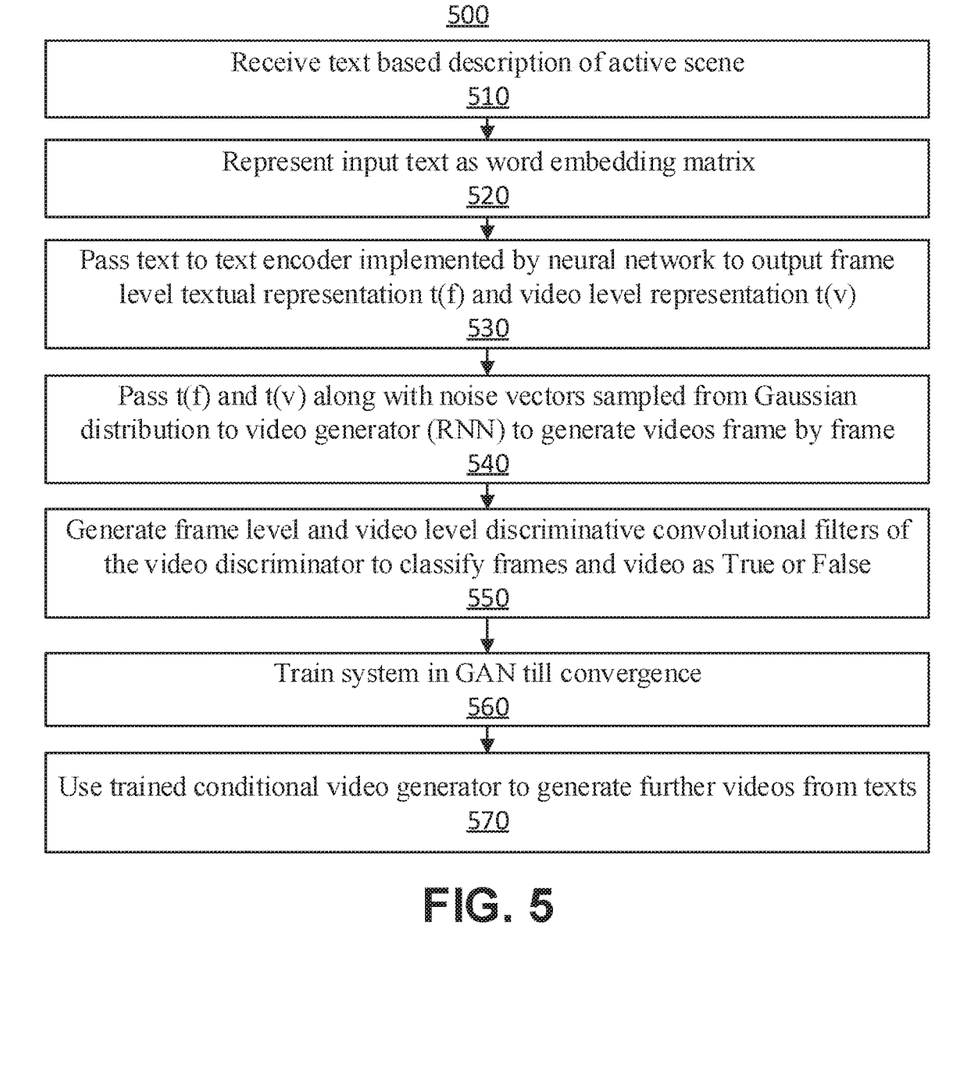
FIG. 5 is a block/flow diagram illustrating a method for implementing a text filter conditional generative adversarial network (TFGAN), in accordance with an embodiment of the present invention.

FIG. 5 is a flow diagram illustrating a method 500 of implementing a text filter generative adversarial network (TF-GAN), in accordance with the present invention.

At block 510, system 300 receives a text-based description of an active scene. For example, system 300 can receive a text-based dangerous traffic scene description. The scene description can describe elements in the scene (for example, a number of cars, cyclists, pedestrians, traffic lights, etc.), the positions of the elements (for example, relative to each other, such as right left, etc.) and an action of the elements (for example, switching lanes, speeding, crossing a white line, etc.), etc. In another embodiment, the active scene can include an action sequence in a fantasy world of a movie.

At block 520, system 300 represents the input text as a word embedding matrix.

At block 530, system 300 passes the text to a text encoder T implemented by a 1D convolutional neural network, CNN, (or a recurrent neural network (RNN)) to output frame-level textual representation t(f) and video-level representation t(v).

At block 540, system 300 passes t(f) and t(v) along with noise vectors sampled from a Gaussian distribution to a video generator (RNN) to generate videos frame by frame.

At block 550, system 300 uses t(f) and t(v), respectively, to generate frame-level and video-level discriminative convolutional filters of the video discriminator to classify the generated frames and the whole video and some real corresponding frames/video as True or False.

At block 560, system 300 trains the whole system in a Generative Adversarial Network till convergence. System 300 can train the system to increase a stability, quality and the diversity of the generated images.

At block 570, system 300 uses the trained conditional video generator for generating videos from texts.

Figure 6:
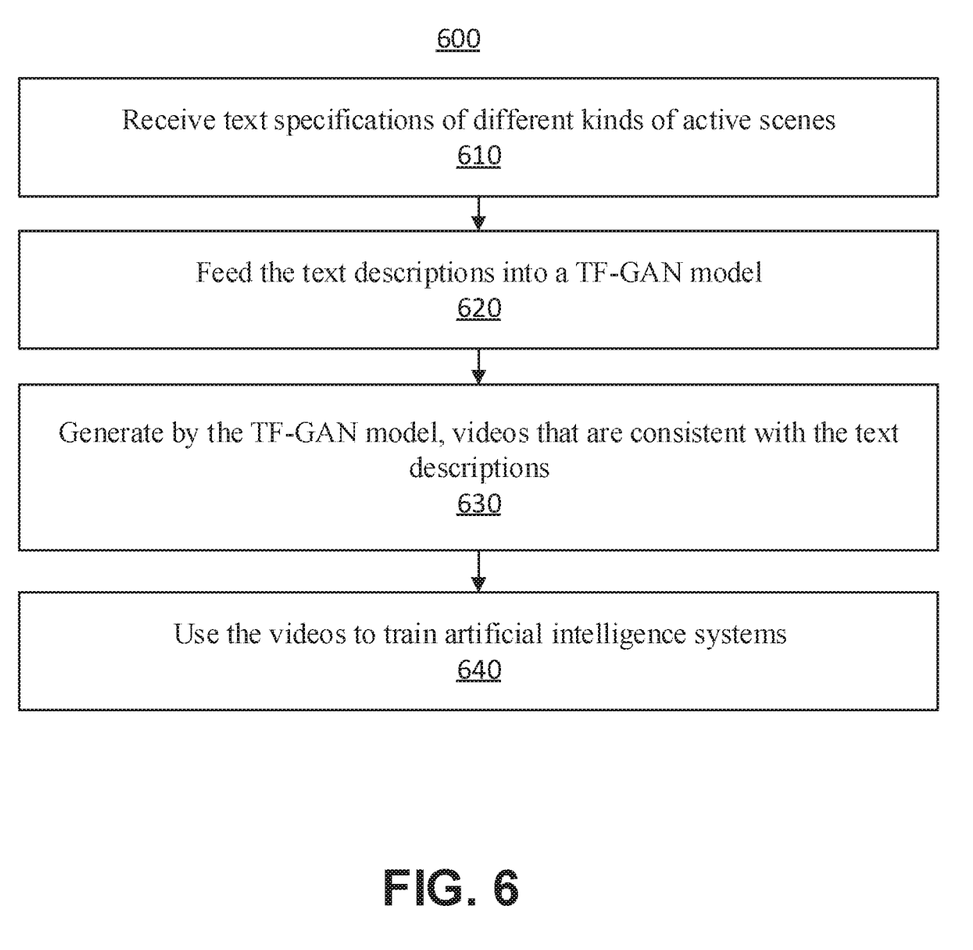
FIG. 6 is a flow diagram illustrating a system/method for implementing a trained conditional video generator, in accordance with an embodiment of the present invention.

FIG. 6 is a flow diagram illustrating a method 600 of implementing a trained conditional video generator, in accordance with the present invention.

At block 610, system 300 receives word description (for example, a user specified description) of active scenes (for example, different iterations of similar types or classes of active scenes). For example, the user can provide a text description of many kinds of suspicious/abnormal scene descriptions in texts. In another embodiment, the user can provide a text (for example, word) description of many kinds of normal traffic video descriptions.

At block 620, system 300 feeds the input text descriptions into a TF-GAN model. For example, the text descriptions can be fed into a model as described with respect to FIGS. 3 and 4, herein above.

At block 630, system 300 generates (for example, determines) and outputs, from the TF-GAN model, videos (for example, several videos) that are consistent with the text descriptions.

At block 640, system 300 uses the output video to train an artificial intelligence (AI) system, such as AI control system in self-driving cars. In another embodiment, the output videos are used to train surveillance AI systems.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing processing video, comprising:
   receiving a text-based description of at least one active scene;
   representing, by a processor device, the text-based description as a word embedding matrix;
   using a text encoder implemented by neural network to output at least one frame level textual representation and at least one video level representation of the word embedding matrix;
   generating, by a shared generator, at least one frame by frame video based on the at least one frame level textual representation, the at least one video level representation and noise vectors sampled from a Gaussian distribution;
   generating a frame level and a video level convolutional filter of a video discriminator to classify frames and video of the at least one frame by frame video as true or false;
   optimizing the text encoder T, based on applying:

$$\max_T L_T = E_{(v,t) \sim P_{data,real}} \log(D(v, T(t))) + E_{(v,t) \sim P_{data,fake}} \log(1 - D(v, T(t)))$$

Wherein $$\max_T L_T$$

is a maximum loss, $p_{data,real}$ denotes a real data distribution with correct video-text correspondences, $p_{data,fake}$ denotes a distribution with incorrect video-text correspondences, v is the video level representation, t is the frame level textual representation, and D is a discriminator; and
   training a conditional video generator that includes the text encoder, the video discriminator, and the shared generator in a generative adversarial network to convergence.

2. The method as recited in claim 1, further comprising: using the trained conditional video generator to generate at least one further video from additional text.

3. The method as recited in claim 2, further comprising: generating the at least one further video for an input to a process selected from a group consisting of multimedia applications, generating synthetic datasets, model-based reinforcement learning systems, and domain adaptation.

4. The method as recited in claim 2, further comprising: training an artificial intelligence system based on the at least one further video.

5. The method as recited in claim 4, wherein the artificial intelligence system is selected from a group consisting of a control system for self-driving cars and a surveillance system.

6. The method as recited in claim 2, wherein using the trained conditional video generator to generate at least one further video further comprises:
   producing a variable length video.

7. The method as recited in claim 1, wherein the at least one active scene includes a text-based dangerous traffic scene description.

8. The method as recited in claim 1, wherein the at least one active scene includes a suspicious scene description.

9. The method as recited in claim 1, further comprising: determining a photo-realistic video synthesis using a deeper generator-discriminator.

10. The method as recited in claim 1, wherein the shared frame generator network further comprises:
    a motion and content decomposed generative adversarial network (MoCoGAN) that generates a video by mapping a sequence of random vectors to a sequence of video frames.

11. A computer system for processing video, comprising:
    a processor device operatively coupled to a memory device, the processor device being configured to:
    receive a text-based description of at least one active scene;
    represent the text-based description as a word embedding matrix; and
    use a text encoder implemented by neural network to output at least one frame level textual representation and at least one video level representation of the word embedding matrix;
    generate, by a shared generator, at least one frame by frame video based on the at least one frame level textual representation, the at least one video level representation and noise vectors sampled from a Gaussian distribution;
    optimize the text encoder T, based on applying:

$$\max_T L_T = E_{(v,t) \sim p_{data,real}} \log(D(v, T(t))) + E_{(v,t) \sim p_{data,fake}} \log(1 - D(v, T(t)))$$

wherein $$\max_T L_T$$

is a maximum loss, $p_{data,real}$ denotes a real data distribution with correct video-text correspondences, $p_{data,fake}$ denotes a distribution with incorrect video-text correspondences, v is the video level representation, t is the frame level textual representation, and D is a discriminator; and
    train a conditional video generator that includes the text encoder, the video discriminator, and the shared generator in a generative adversarial network to convergence.

12. The system as recited in claim 11, wherein the processor device is further configured to:
    use the trained conditional video generator to generate at least one further video from additional text.

13. The system as recited in claim 12, wherein the processor device is further configured to:
    generate the at least one further video for an input to a process selected from a group consisting of multimedia applications, generating synthetic datasets, model-based reinforcement learning systems, and domain adaptation.

14. The system as recited in claim 12, wherein the processor device is further configured to:
train an artificial intelligence system based on the at least one further video.

15. The system as recited in claim 14, wherein the artificial intelligence system is selected from a group consisting of a control system for self-driving cars and a surveillance system.

16. The system as recited in claim 12, wherein, when using the trained conditional video generator to generate at least one further video, the processor device is further configured to:
produce a variable length video.

17. The system as recited in claim 11, wherein the at least one active scene includes a text-based dangerous traffic scene description.

18. The system as recited in claim 11, wherein the at least one active scene includes a suspicious scene description.

19. A computer program product for implementing a text filter generative adversarial network (TF-GAN), the computer program product comprising a non-transitory computer readable storage medium having program instructions embodied therewith, the program instructions executable by a computing device to cause the computing device to perform the method comprising:
receiving a text-based description of at least one active scene;
representing, by a processor device, the text-based description as a word embedding matrix;
using a text encoder implemented by neural network to output at least one frame level textual representation and at least one video level representation of the word embedding matrix;
generating, by a shared generator, at least one frame by frame video based on the frame level textual representation, the video level representation and noise vectors sampled from a Gaussian distribution;
generating a frame level and a video level convolutional filter of a video discriminator to classify frames and video of the at least one frame by frame video as true or false;
optimizing the text encoder T, based on applying:

$$\max_T L_T = E_{(v,t) \sim P_{data,real}} \log(D(v, T(t))) + E_{(v,t) \sim P_{data,fake}} \log(1 - D(v, T(t)))$$

wherein $$\max_T L_T.$$

is a maximum loss, $p_{data,real}$ denotes a real data distribution with correct video-text correspondences, $p_{data,fake}$ denotes a distribution with incorrect video-text correspondences, v is the video level representation, t is the frame level textual representation, and D is a discriminator; and
training a conditional video generator that includes the text encoder, the video discriminator, and the shared generator in a generative adversarial network to convergence.

* * * * *